(12) United States Patent
Yao

(10) Patent No.: US 7,762,620 B2
(45) Date of Patent: Jul. 27, 2010

(54) VEHICLE BODY SIDE STRUCTURE

(75) Inventor: Takashi Yao, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 176 days.

(21) Appl. No.: 11/661,417

(22) PCT Filed: Jul. 21, 2006

(86) PCT No.: PCT/IB2006/002011
§ 371 (c)(1),
(2), (4) Date: Feb. 28, 2007

(87) PCT Pub. No.: WO2007/010381
PCT Pub. Date: Jan. 25, 2007

(65) Prior Publication Data
US 2008/0093889 A1    Apr. 24, 2008

(30) Foreign Application Priority Data
Jul. 21, 2005    (JP) .............................. 2005-211236

(51) Int. Cl.
*B62D 25/02* (2006.01)
(52) U.S. Cl. ........................... 296/187.12; 296/203.03; 296/146.6
(58) Field of Classification Search ............ 296/187.03, 296/187.08, 187.12, 193.05, 203.03, 207, 296/146.1, 146.5, 146.6, 193.07, 204
See application file for complete search history.

(56) References Cited
U.S. PATENT DOCUMENTS
3,328,935 A * 7/1967 Peras ........................... 52/630

4,934,751 A * 6/1990 Shimoda ................. 296/203.03
5,000,509 A   3/1991 Sinnhuber et al.
5,110,176 A * 5/1992 Curtis ..................... 296/187.12
5,464,266 A   11/1995 Guertler (Continued)

FOREIGN PATENT DOCUMENTS
FR         2 377 299         1/1977

(Continued)

OTHER PUBLICATIONS
International Search Report dated Nov. 7, 2006.
Written Opinion of the ISA.
Japanese Office Action dated Oct. 24, 2008.

*Primary Examiner*—Glenn Dayoan
*Assistant Examiner*—Gregory Blankenship
(74) *Attorney, Agent, or Firm*—Finnegan, Henderson, Farabow, Garrett & Dunner, LLP

(57) ABSTRACT

A vehicle body side structure is provided in which a load transmission member has a lateral inboard portion and a load-receiving member has a lateral outward portion facing the lateral inboard portion of the load transmission member. The lateral inboard portion and the lateral outward portion are configured to transmit loads, applied on a vehicle door in multiple directions from an inner door auxiliary member to a crossmember. Accordingly, the load applied to a location offset from the load transmission member and the load applied on the vehicle door in the direction oblique to the lateral direction of the vehicle are effectively transmitted to the crossmember (vehicle body) without substantial reduction of the road transmission rate. Thus, transferring the force of an offset impact as efficiently as that of an impact that occurs on the location of the load transmission member.

7 Claims, 14 Drawing Sheets

U.S. PATENT DOCUMENTS

| | | | |
|---|---|---|---|
| 6,229,239 B1* | 5/2001 | Lucidarme et al. | 310/162 |
| 6,237,991 B1* | 5/2001 | Weber | 296/187.12 |
| 6,568,745 B2* | 5/2003 | Kosuge et al. | 296/193.02 |
| 6,644,723 B2* | 11/2003 | Motozawa | 296/187.12 |
| 6,663,166 B2* | 12/2003 | Achleitner | 296/146.6 |
| 6,758,516 B1* | 7/2004 | Abramczyk et al. | 296/187.12 |
| 6,969,110 B2* | 11/2005 | Ali et al. | 296/187.12 |
| 7,104,592 B2* | 9/2006 | Song | 296/187.12 |
| 7,216,924 B2* | 5/2007 | Li et al. | 296/187.12 |
| 7,300,099 B2* | 11/2007 | Godfrey et al. | 296/187.12 |
| 7,328,938 B2* | 2/2008 | Matsuda | 296/187.12 |
| 7,331,626 B2* | 2/2008 | Yoshimoto et al. | 296/187.12 |
| 7,347,489 B2* | 3/2008 | Ziaja et al. | 296/193.03 |
| 7,413,242 B2* | 8/2008 | Rashidy et al. | 296/193.02 |
| 7,448,674 B2* | 11/2008 | Brunner et al. | 296/193.02 |
| 7,481,485 B2* | 1/2009 | Ma et al. | 296/187.12 |
| 7,537,273 B2* | 5/2009 | Lassl et al. | 296/187.12 |
| 2006/0033357 A1* | 2/2006 | Karuppaswamy et al. | 296/146.6 |
| 2006/0202513 A1* | 9/2006 | Matsuda | 296/187.12 |
| 2007/0063543 A1* | 3/2007 | Roccato et al. | 296/187.08 |
| 2007/0152474 A1* | 7/2007 | Lassl et al. | 296/187.12 |
| 2009/0085375 A1* | 4/2009 | Fonseka et al. | 296/187.12 |

FOREIGN PATENT DOCUMENTS

| | | |
|---|---|---|
| JP | 7-81507 | 3/1995 |
| JP | 07 323867 A | 12/1995 |
| JP | 8-26144 | 1/1996 |
| JP | 10-95231 | 4/1998 |
| JP | 11 255154 A | 9/1999 |
| JP | 2002 225561 | 8/2002 |

* cited by examiner

VEHICLE BODY SIDE STRUCTURE

BACKGROUND OF THE INVENTION

1. Field of the Invention

The present invention relates to a vehicle body side structure that absorbs a side impact load in a side impact collision.

2. Description of the Related Art

Conventional vehicle body side structures that absorb a side impact load in a side impact collision are described in JP-A-10-95231, JP07-81507 and JP-A-08-26144. For example, in JP-A-10-95231, a bracket for load transmission is attached to an impact bar, which extends in a longitudinal direction and is attached to a lower portion of the interior of a vehicle door. An inboard surface of the bracket faces an end surface of a crossmember.

In the above-described conventional structure, however, when the side impact load is applied to a location that is offset from the bracket (e.g. a location that is, for example, located forward of the bracket), the load transmission rate to the crossmember, and hence the vehicle body, decreases. Accordingly, the thickness of the door panel must be increased to absorb a larger impact load.

In other words, in the above-described conventional structure, the bracket for load transmission and an end surface of the crossmember are aligned only in the lateral direction. Accordingly, the side impact load is effectively transmitted to the bracket when the side impact load is applied at the exact location of the bracket and only in a lateral direction. However, the load transmission rate decreases when an offset side impact load is applied to the bracket location, because the bracket is not in planar contact with the crossmember, which results in local (i.e., partial) deformation of the contact portion or the decreases of deformation resistance.

SUMMARY OF THE INVENTION

The present invention provides a vehicle body side structure that prevents decreases in the load transmission rate even when the applied side impact load is offset from the location of the vehicle body side structure.

In an aspect of the present invention, the vehicle body side structure includes a crossmember that is mounted in the vehicle interior floor and extends in a lateral direction of the vehicle, a door mounted laterally outside the crossmember, and an inner door auxiliary member that is provided at a lower portion in the interior of the door and that extends in a longitudinal direction of the vehicle. A load transmission member is mounted inside the door and has a lateral inboard portion. A load-receiving member is formed on the crossmember and has a lateral outward portion facing the lateral inboard portion of the load transmission member. The lateral inboard portion and the lateral outward portion are configured to transmit impact loads that may be applied to the door from the inner door auxiliary member to the crossmember. The impact loads may be applied in different of directions from each other.

In the vehicle body side structure, the impact loads may include a first impact load applied in a first direction and a second impact load applied in a second direction that is different from the first direction. The lateral outward portion of the load-receiving member may include a first portion that receives the first impact load from the load transmission member and a second portion that receives the second impact load from the load transmission member.

In the vehicle body side structure, the impact loads may include a first impact load applied in a first direction and a second impact load applied in a second direction that is different from the first direction. The lateral inboard portion of the load transmission member may include a first portion that transmits the first impact load to the load-receiving member and a second portion that transmits the second impact load to the load-receiving member.

In the vehicle body side structure according to the above aspects of the present invention, the load-receiving member and the load transmission member are configured to transmit multiple loads applied on the vehicle door in multiple directions from the inner door auxiliary member to the crossmember. Accordingly, the side impact load applied to the location that is offset from the load transmission member and the side impact load applied on the door in the direction oblique to the lateral direction of the vehicle are transmitted to the crossmember (vehicle body) without substantial reduction of (or substantial variations in) the load transmission rate, as well as the side impact load applied to the (exact) location of the load transmission member only in the lateral direction of the vehicle.

The load-receiving member may have a first surface and a second surface, which correspond to the first portion and the second portion, and receive the first load and second load, respectively. Alternatively, the load transmission member may include a first surface and a second surface, which correspond to the first portion and the second portion, and transmit the first load and second load, respectively.

According to the aspect of the present invention, when a side impact load is applied in the multiple directions, such as the direction facing each load-receiving surface, the load transmission member comes into substantial planar contact with the load-receiving member because the load-receiving member has multiple load-receiving surfaces, or the load transmission member has multiple load transmission surfaces. When the load transmission member is in substantial planar contact with the load-receiving member, the deformation resistance is less likely to decrease and the local (partial) deformation is less likely to occur (progress) at the contact portion, in comparison with a point or line contact. In other words, the transmission rate from the load transmission member to the load-receiving member does not decrease, even if an offset impact load is applied to the vehicle door. Thus, the side impact load is further appropriately transmitted to the crossmember (vehicle body) and the side impact load is effectively absorbed in the vehicle body.

When viewed from above the vehicle, the first surface of the load-receiving member may extend in a substantially longitudinal direction of the vehicle and may be substantially vertical. The second surface of the load-receiving member may be inclined at a predetermined angle with respect to the first surface.

According to the aspect of the present invention, because the vehicle body side structure has load receiving surfaces that includes first surface that extends in a substantially longitudinal direction of the vehicle and is substantially vertical, and when viewed from the top of the vehicle, the second surface is inclined at a predetermined angle with respect to the first surface, the load transmission member comes into a substantial planar contact with the first surface when the side impact load is applied to the location of the load transmission member. The load transmission member comes into substantial planar contact with the second surface when the side impact load is applied to the location spaced from the load transmission member. Thus, the side impact load is effectively transmitted to the crossmember.

In other words, in the vehicle body side structure according to the aspect of the present invention, the side impact load applied to the location offset from the load transmission member and the side impact load applied in the direction at a predetermined angle with respect to the lateral direction of the vehicle are transmitted to the crossmember without substantial reduction of or substantial variations in the load transmission rate, relative to side impact loads applied to the (exact) location of the load transmission member.

In an additional aspect of the present invention, the second surface may be located forward of the first surface in the longitudinal direction of the vehicle, and the predetermined angle may be between 15 and 20 degrees.

In the vehicle body side structure according to the aspect of the present invention, because the second surface is located forward of the first surface in the longitudinal direction of the vehicle, and the second surface is inclined at an angle between 15° and 20° with respect to the first surface and faces forward and outward, the inboard surface of the load transmission member comes into substantial planar contact with the second surface when the application of a side impact load to the location spaced forwardly from the load transmission member or in a direction at the predetermined angle with respect to the lateral direction causes the inboard surface of the load transmission member to be inclined to face rearward and inward.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF THE PREFERRED EMBODIMENTS

Embodiments of the present invention will be explained hereinafter with respect to the figures.

Figure 1:
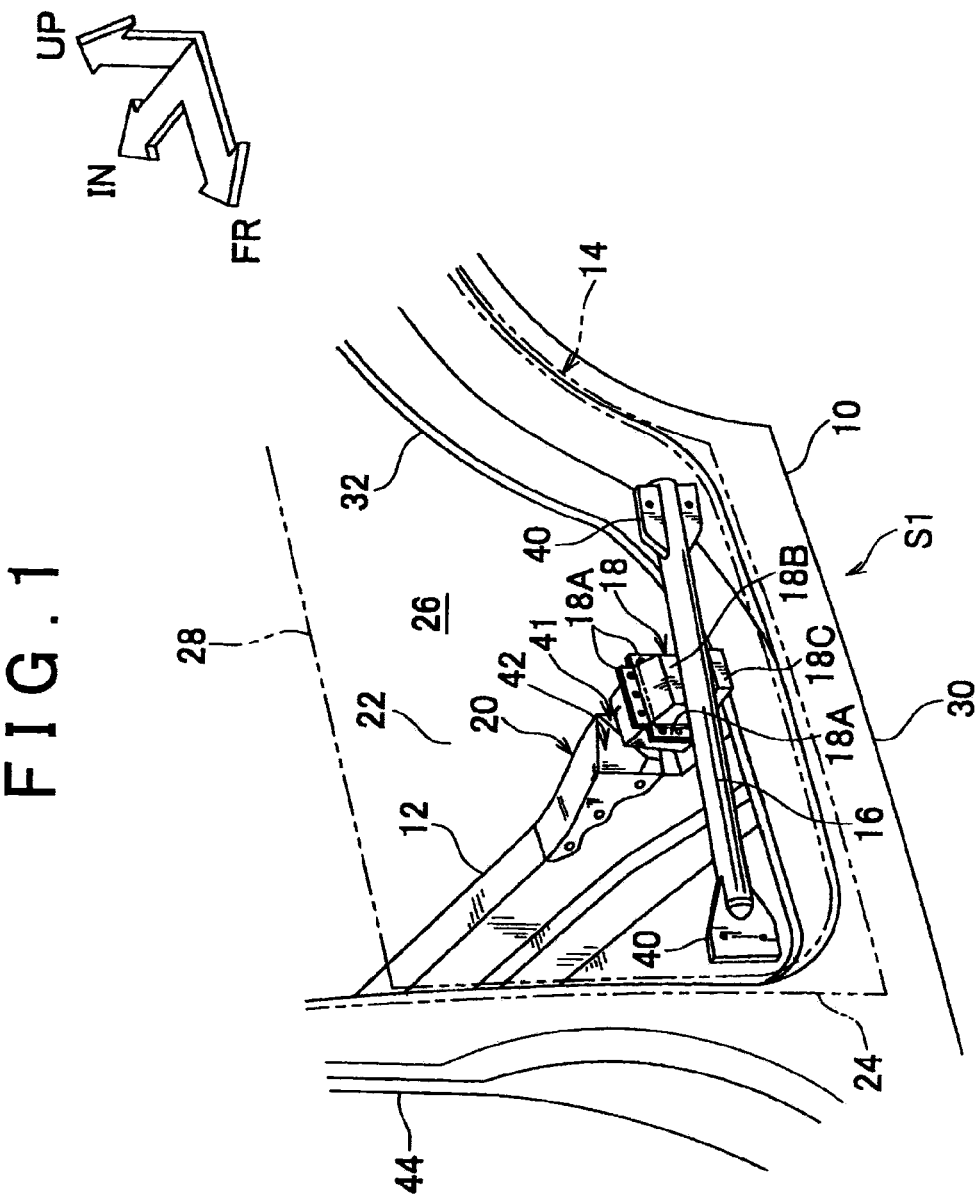
FIG. 1 is a perspective view illustrating a vehicle body side structure inside a door (a vehicle) viewed from the outside of the vehicle according to a first embodiment of the present invention, in which a door is indicted by dashed-two dotted line.
Figure 2:
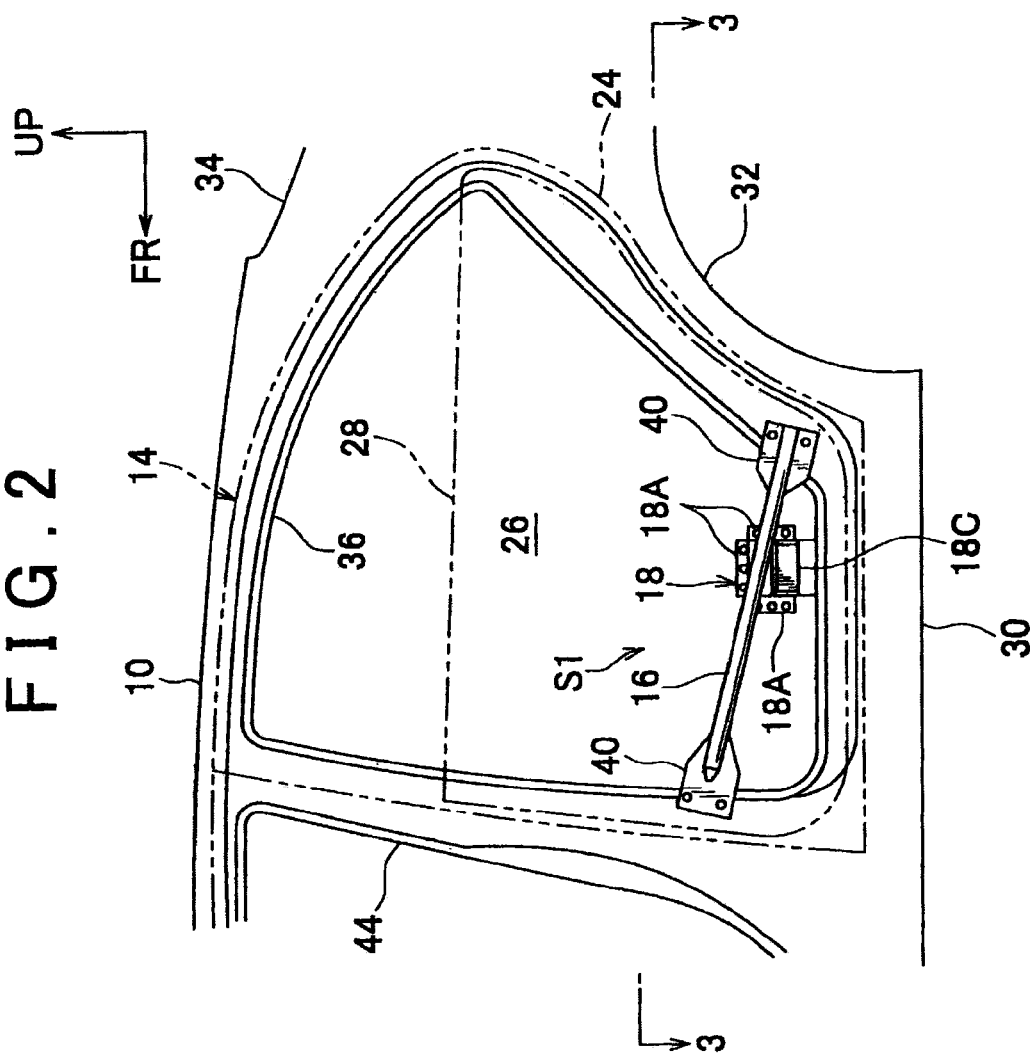
FIG. 2 is a side elevation illustrating the vehicle body side structure inside the door (vehicle) viewed from the outside of the vehicle according to the first embodiment of the present invention.

FIGS. 1 and 2 show a vehicle body side structure S1 according to the first embodiment of the present invention. The vehicle body side structure S1 shown in FIGS. 1 and 2 is related to a load transmission structure in which, when a side impact collision occurs at the rear door position of a sedan automobile, the vehicle body 10 receives the side impact load. The vehicle body side structure S1 includes a door 14, an impact beam (inner door auxiliary member provided inside the door) 16, a load transmission member 18 and a load-receiving member 20.

The crossmember 12 is a reinforcement member that is mounted on the vehicle interior floor 22 of the vehicle body 10 by welding, for example, and, extends in the lateral direction of the vehicle body 10. Both outer ends of the crossmember 12 extending in the lateral direction curve downward at the lateral ends of the vehicle interior floor 22, and are connected to the rockers 30 that extend in the longitudinal direction of the vehicle.

The door 14 is mounted laterally outside the crossmember 12. The door is formed at least by an outer door panel 24 and an inner door panel 28. The door 14 is a rear door that is mounted to a center pillar 44 by hinges (not shown). The center pillar 44 extends upward from the rocker 30. As shown in FIG. 2, a rear wheelhouse 32 is provided at the rear end of the rocker 30. A rear pillar 34 is provided above the rear wheelhouse 32. A roof side rail 36 extends toward the front of the vehicle in a longitudinal direction of the vehicle from the upper end of the rear pillar 34. The upper end of the center pillar 44 is connected to the roof side rail 36. Thus, a door-opening portion 26 is formed as a region enclosed by the center pillar 44, rocker 30, rear wheelhouse 32, rear pillar 34 and roof side rail 36.

In FIGS. 1 and 2, the inner door auxiliary member, such as the impact beam 16 is, for example, a high tensile steel pipe that is mounted to the lower portion of the interior of the door 14 and extends in the longitudinal direction of the vehicle. The front and rear ends of the impact beam 16 are fixed to the door 14 via mounting brackets 40, respectively. As shown in FIG. 2, the lower portion of the interior of the door 14 is the location at which the impact beam 16 overlaps with the cross member 12 in the side view of the vehicle. Thus, the side impact load is effectively transmitted from the impact beam 16 to the crossmember 12 when a side impact collision occurs. As to the location relative to the rear seat, the impact beam 16 extends in the longitudinal direction of the vehicle and is located laterally outside the foot region of the rear seat to protect the foot region. As shown in FIG. 2, the impact beam 16 is inclined so that the front end is higher than the rear end. The door interior auxiliary member may be a plate-shaped reinforcement member, the inner door panel itself partially reinforced, or any other structure that reinforces the door 14 and transmits the side impact load to the load transmission member 18.

Figure 3:
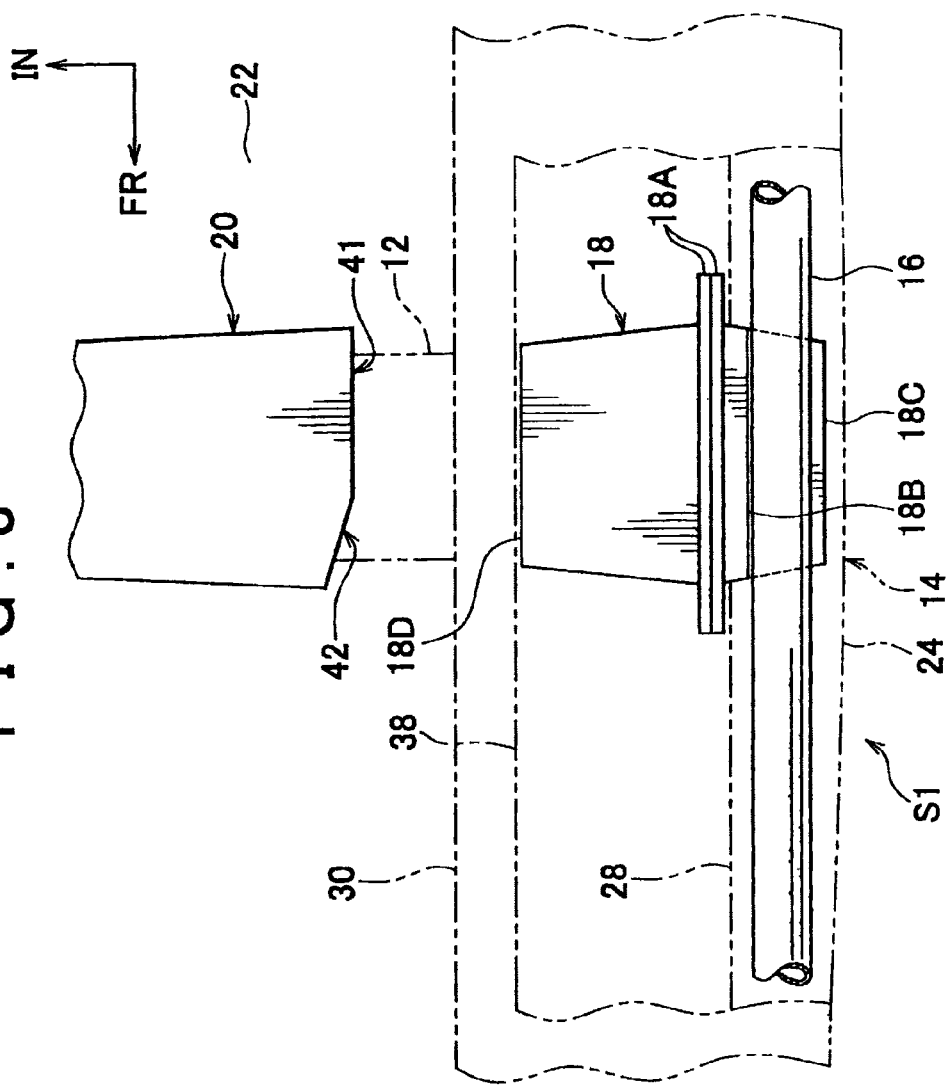
FIG. 3 is an arrow view taken along 3-3 of FIG. 2 that shows the vehicle body side structure according to the first embodiment of the present invention.

As shown in FIG. 3, the load transmission member 18 may be a closed-cross section member, which is formed by joining and connecting opposed flange portions 18A of two box-shaped members. The two box-shaped members may be formed by press molding of an iron plate. The load transmission member 18 is fixed, for example, on the inboard side of the impact beam 16 in the door 14, so that the side impact load can be transmitted from the impact beam 16 to the crossmember 12. The load transmission member 18 extends through the inner door panel 28 and is attached to the inner door panel 28 by, for example, welding the approximate center potion of the flange portions 18A to the inner door panel 28 or bolting. The load transmission member 18 is provided in the interior panel 38.

The lateral outside surface 18B of the load transmission member 18 is adjacent to or contacts the inboard portion of the impact beam 16. A support portion 18C extends laterally outward from the lower end of the lateral outside surface 18B and extends under the impact beam 16 to support the impact beam 16. The support portion 18C suppresses the downward movement of the impact beam 16 when a downward impact load is applied to the impact beam 16. An inboard surface 18D of the load transmission member 18 may be, for example, a flat surface, and faces the load-receiving member 20 in the lateral direction of the vehicle.

In FIGS. 1 and 3, the load-receiving member 20 is mounted on the crossmember 12, and faces the inboard portion of the load transmission member 18. In order to receive loads in multiple directions from the load transmission member 18, the load-receiving member 20 has multiple load receiving surfaces, such as a first surface 41, which extends in the longitudinal direction of the vehicle and in the vertical direction, and a second surface 42, which is oblique to the first surface 41 when viewed from the top of the vehicle. The first surface 41 is generally parallel to the inboard surface 18D of the load transmission member 18.

Figure 7:
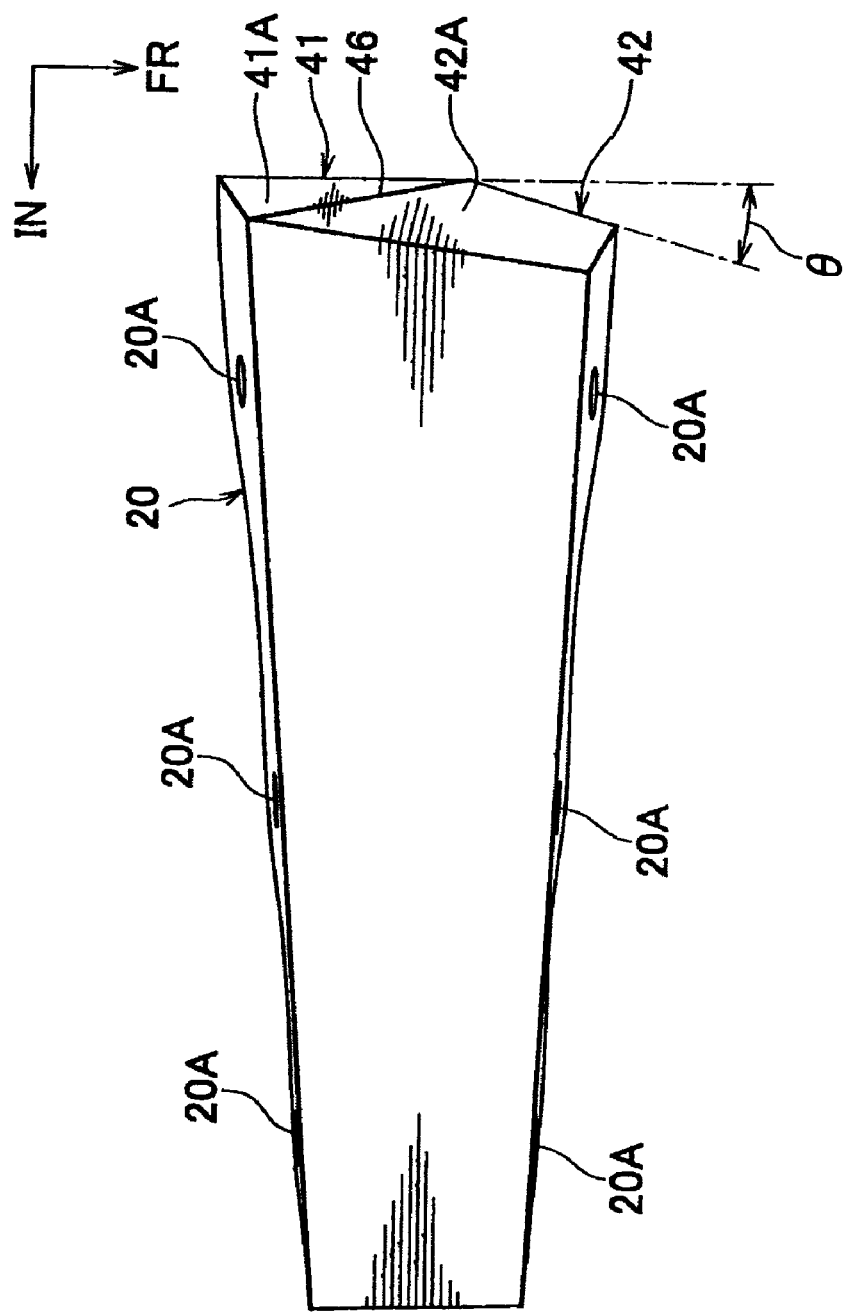
FIG. 7 is an arrow view in a direction of arrow 7 of FIG. 4.

As shown in FIG. 3, the second surface 42 is located longitudinally forward of the first surface 41. As shown in FIG. 7, the second surface 42 is inclined, for example, at an angle (θ) between 15 and 20 degrees with respect to the first surface 41 and faces toward the front of or oblique to the vehicle. The second surface 42 may be formed, for example, by cutting off a portion of the load-receiving surface, such as the edge of the load-receiving member 20. Thus, the weight of the load-receiving member 20 is reduced by the weight of the cut-off portion.

The inclination angle of the second surface 42 with respect to the first surface 41 may be between 15 to 20 degrees, because the second surface 42 would almost be parallel to the first surface 41 if the angle is smaller than 15 degrees. In this case, when a side impact load is applied to the location that is offset from the load transmission member 18 and the load transmission member 18 is thus tilted, the load transmission rate decreases because the inboard surface 18D of the load transmission member 18 is not likely to be in substantial planar contact with the second surface 42. On the other hand, the load transmission rate also decreases when the angle is larger than 20 degrees, because the lateral component of the load to be transmitted to the crossmember 12 decreases, although the inboard surface 18D of the load transmission member 18 comes into substantial planar contact with the second surface 42.

Figure 4:
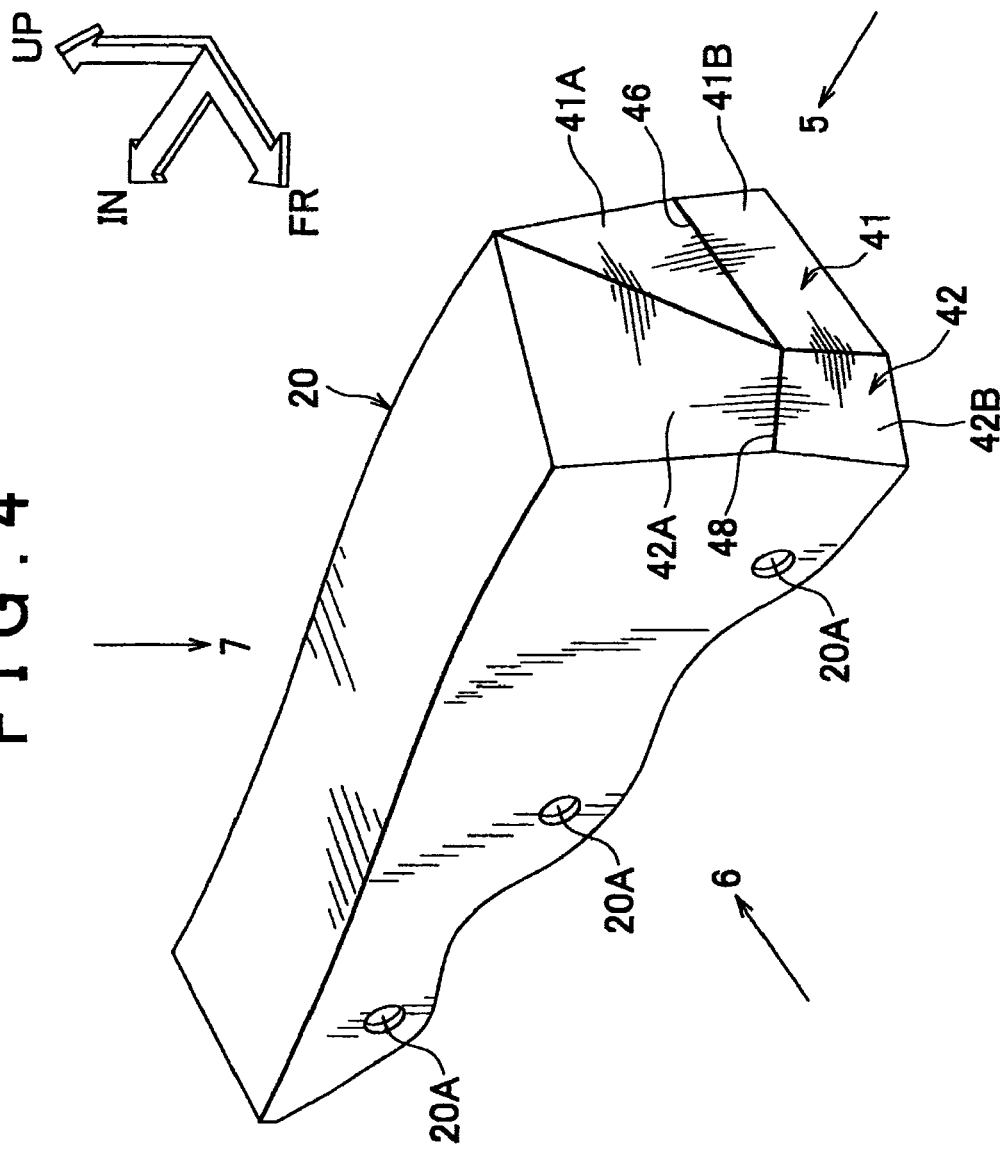
FIG. 4 is a perspective view illustrating a load receiving member.
Figure 5:
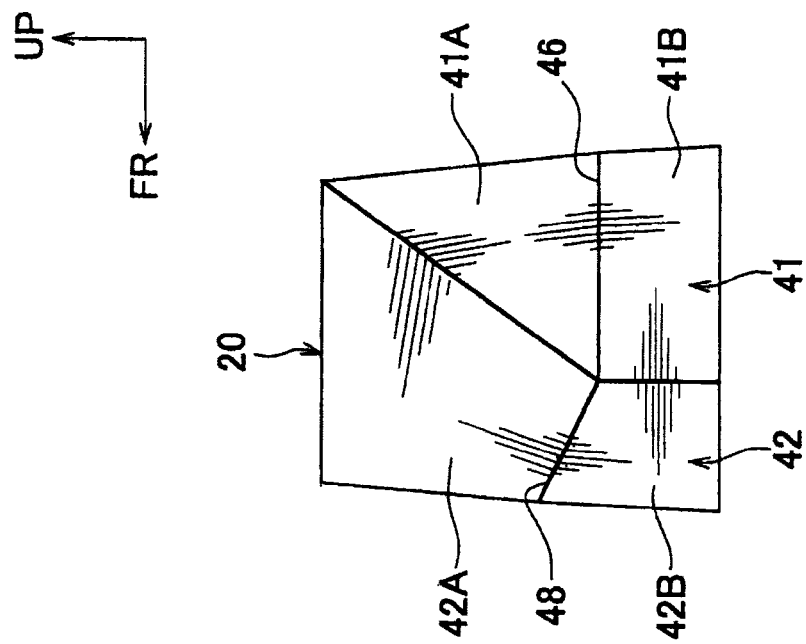
FIG. 5 is an arrow view in a direction of arrow 5 of FIG. 4.

As shown in FIGS. 4 and 5, the first surface 41 and the second surface 42 may be divided by the ridge lines 46 and 48 to form upper portions 41A and 42A, which are inclined to face upwards, and lower portions 41B and 42B, which extend substantially vertical. With this structure, when the side impact load is applied to the location above the impact beam 16 and the inboard surface 18D of the load transmission member 18 is inclined downwards, the load transmission member 18 tends to be in substantial planar contact with the upper portion 41A or 42 A of the load-receiving member 20.

Figure 6:
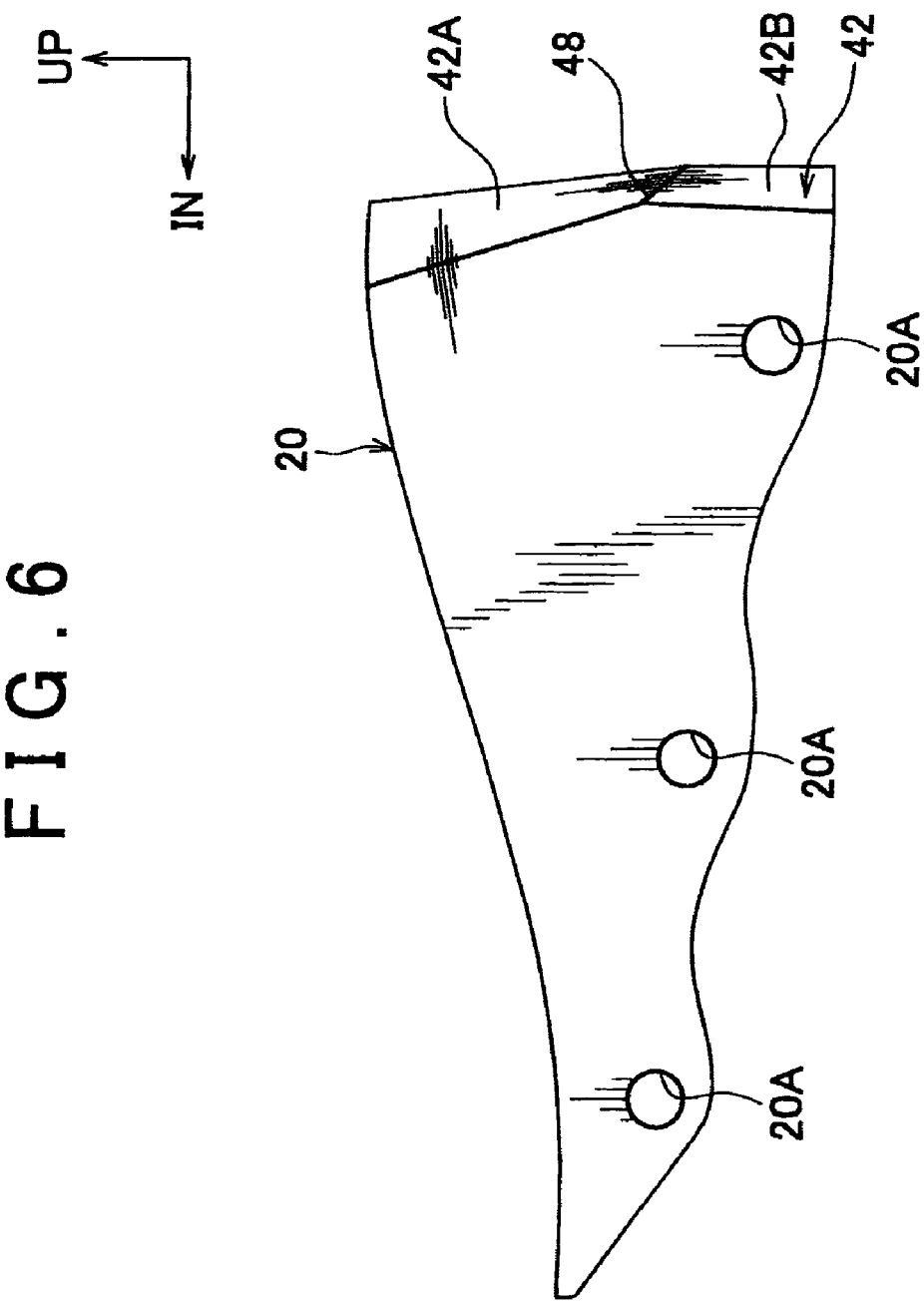
FIG. 6 is an arrow view in a direction of arrow 6 of FIG. 4.

As shown in FIGS. 4 and 6, the load-receiving member 20 is provided separately from the crossmember 12. The height of the load-receiving member 20 gradually decreases in the lateral inward direction from the outer end of the first surface 41. In consideration of the load transmission rate to the crossmember 12, the load-receiving member 20 may be attached as high as the center region of the crossmember 12. As described above, the lateral outer ends of the crossmember 12 curve downward at the lateral ends of the vehicle interior floor 22. Therefore, if the load-receiving member 20 is attached to the location as high as the curved region (center region) of the crossmember 12, the offset (difference) in height (vertical direction) between the load-receiving member 20 and the load transmission member 18 is reduced and thus the reduction of the load transmission rate is suppressed.

As described above, in the vehicle body side structure S1, when the load is applied to the door 14, the load transmission member 18 comes into substantial planar contact with the load-receiving member 20 in multiple directions, including a lateral direction, without substantial reduction of the load transmission between the load transmission member 18 and the load-receiving member 20. Thus, the impact load is effectively transmitted from the load transmission member 18 to the crossmember 12 via the load-receiving member 20.

In this embodiment, as shown in FIGS. 6 and 7, the load-receiving member 20 is attached to the crossmember 12 by bolting using the attachment openings 20A and bolts (not shown). Alternatively, the load-receiving member 20 may be welded to the crossmember 12. The load-receiving member 20 and crossmember 12 may be unitarily formed in one piece so that the first surface 41 and the second surface 42 of the load-receiving member 20 are integrally formed on the crossmember 12.

In this embodiment, the inboard surface 18D of the load transmission member 18 is formed as a single flat surface, and the load-receiving member 20 has multiple load-receiving surfaces including the first surface 41 and the second surface 42. Alternatively, the lateral outside surface of the load-receiving member 20 may be formed as a single flat surface, and the inboard surface 18D of the load transmission member 18 may have multiple load transmission surfaces.

In the vehicle body side structure S1, the crossmember 12 is provided with the load-receiving member 20 that appropriately receives the loads in the multiple directions from the load transmission member 18. Accordingly, when the side impact load is applied to the location offset from the load transmission member 18, or when the side impact load is applied on the door in a direction that is oblique to the lateral direction, such loads, as well as the load directly applied to the location of the load transmission member 18, are appropriately and efficiently transmitted to the crossmember 12, and hence the vehicle body 10, without the substantial reduction of the load transmission rate. In other words, for example, in addition to the side impact load applied only in the lateral direction of the vehicle, the side impact load applied in the direction different from the lateral direction of the vehicle is transmitted without substantial reduction of the load transmission rate.

Figure 8:
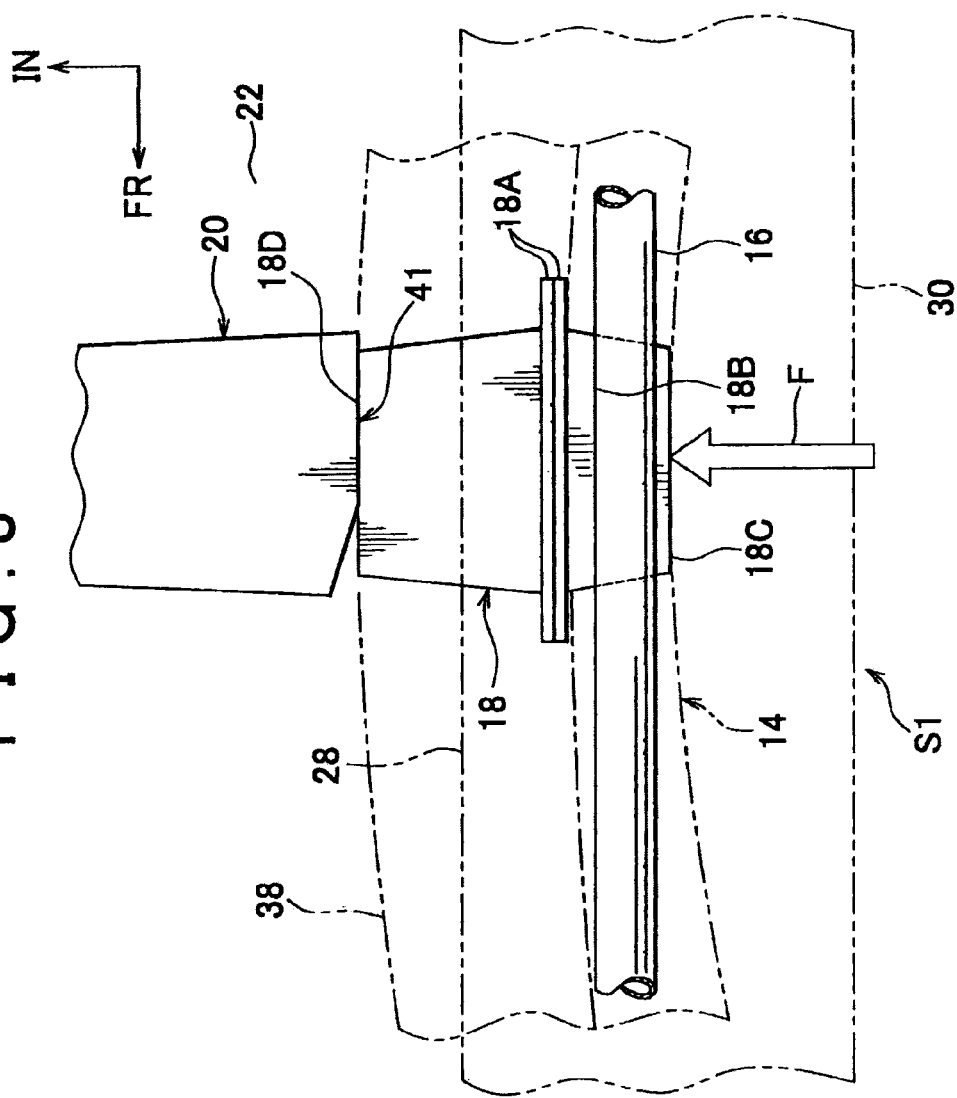
FIG. 8 is a plane view illustrating the inboard surface of a load transmission member being in substantial planar contact with the first surface of a load-receiving member, when a side impact load is applied to the location of the load transmission member.

In more detail, as shown in FIG. 8, when a side impact collision occurs against the door 14 of the vehicle having the vehicle body side structure S1, and a side impact load F is applied in a direction normal to the intersection of the load transmission member 18 and the impact beam 16, the load transmission member 18 is pressed laterally inward, and the inboard surface 18D of the load transmission member 18 comes into contact with the first surface 41 of the load-receiving member 20. In this case, because the inboard surface 18D comes into substantial planar contact with the first surface 41, the deformation resistance is less likely to decrease, in comparison with the point contact or line contact. Thus, a local (partial) deformation is less likely to occur at the contact location. Accordingly, the side impact load F is transmitted to the crossmember 12 without the substantial reduction of the load transmission rate.

Figure 9:
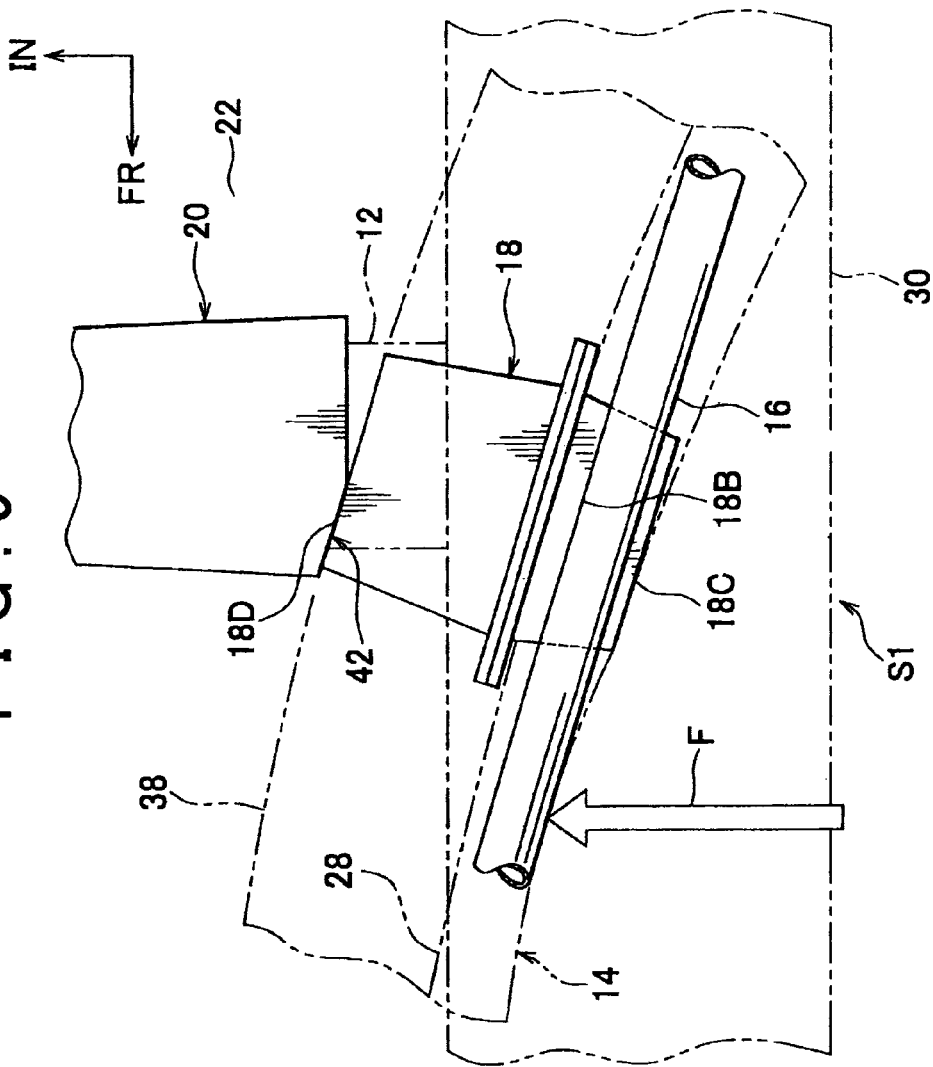
FIG. 9 is a plane view illustrating the inboard surface of the inclined load transmission member being in substantial planar contact with the second surface of the load-receiving member, when a side impact load is applied to the location that is offset to the front of the load transmission member.

As shown in FIG. 9, when the side impact load F is applied on the location that is offset to the front of the load transmission member 18, the load transmission member 18 is inclined and is pressed laterally inward due to the deformation of the door 14 or the impact beam 16. In this case, because the inclined second surface 42 is formed on the load-receiving member 20, the inboard surface 18D of the load transmission member 18 comes into contact with the second surface 42. In other words, because the inboard surface 18D comes into substantial planar contact with the second surface 42, the local deformation is less likely to occur at the contact position, in comparison with a point contact or a line contact. Accordingly, the side impact load F is transmitted to the crossmember 12 without substantial reduction of the load transmission rate. The same effect is obtained when the side impact load F is applied to the door in a direction that is oblique to the lateral direction of the vehicle, such as the oblique front direction of the vehicle.

As described above, in the vehicle body side structure S1, the load-receiving ember 20 receives the side impact load F from the load transmission member 18 in the direction facing the first surface 41 or the second surface 42 (i.e. the direction perpendicular to each surface). Thus, the side impact load F is efficiently transmitted to the vehicle body 10 and is effectively absorbed by the vehicle body 10.

When the side impact load F is applied to the location above the impact beam 16, the inboard surface 18D of the load transmission member 18 may be inclined downwards. Note that the support portion 18C of the load transmission member 18 suppresses the downward movement of the impact beam 16. In this case, if the upper portions 41A and 42A of the first surface 41 and the second surface 42, respectively, are inclined upward with respect to the lower portions 41B and 42B (see FIGS. 4 and 5), the inboard surface 18D comes into substantial planar contact with the load-receiving member 20 (either the upper portion 41A of the first surface 41 or the upper portion 42A of the second surface 42). Thus, the inboard surface 18D of the load transmission member 18 is constructed to come into substantial planar contact with the load transmission member 18 in four directions, i.e., the direction that is perpendicular to each of the upper portions 41A and 42A and lower portions 41B and 42B of the first and second surfaces 41 and 42. Accordingly, a variety of side collision force can be efficiently and effectively absorbed.

Figure 10:
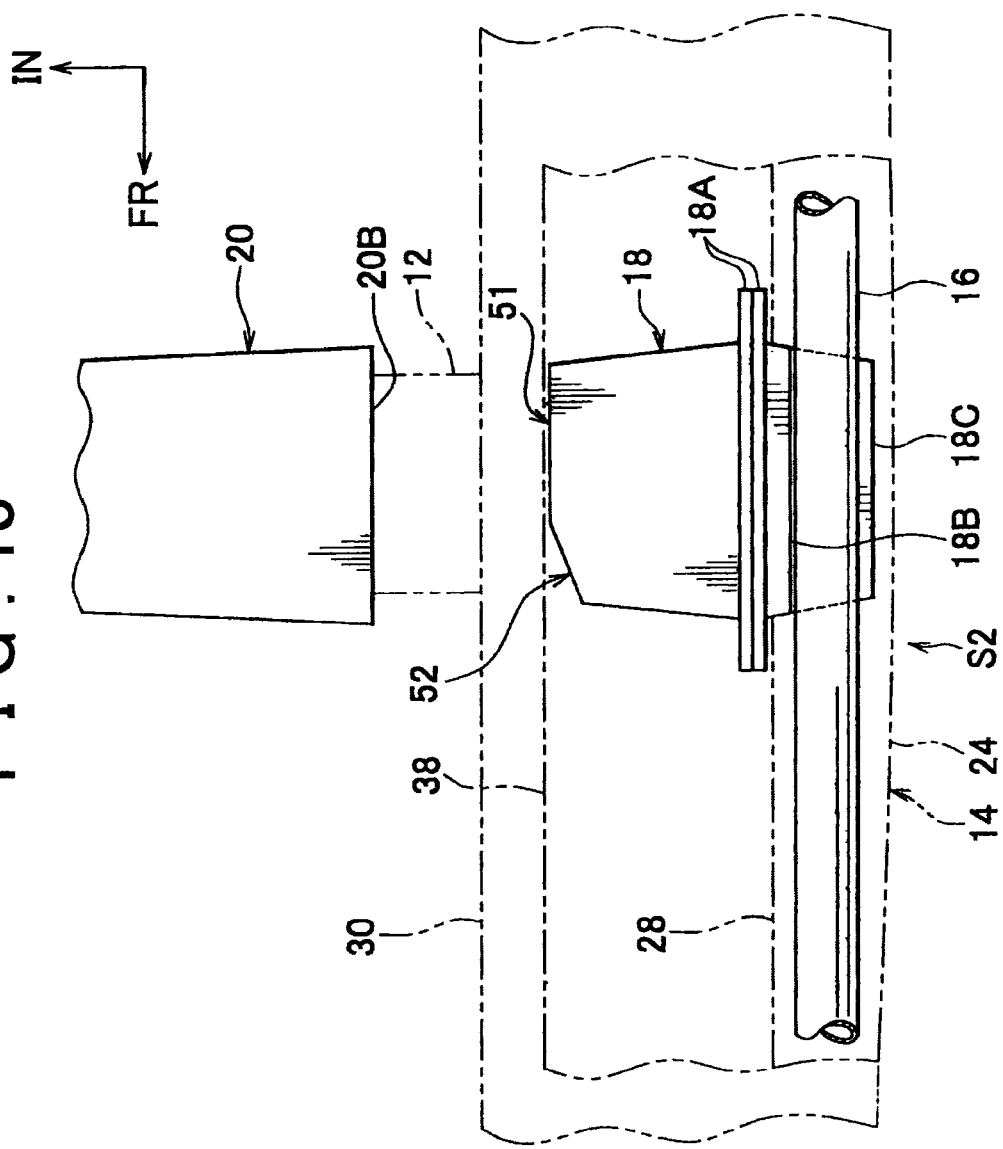
FIG. 10 is a plane view illustrating a vehicle body side structure according to a second embodiment of the present invention.
Figure 13:
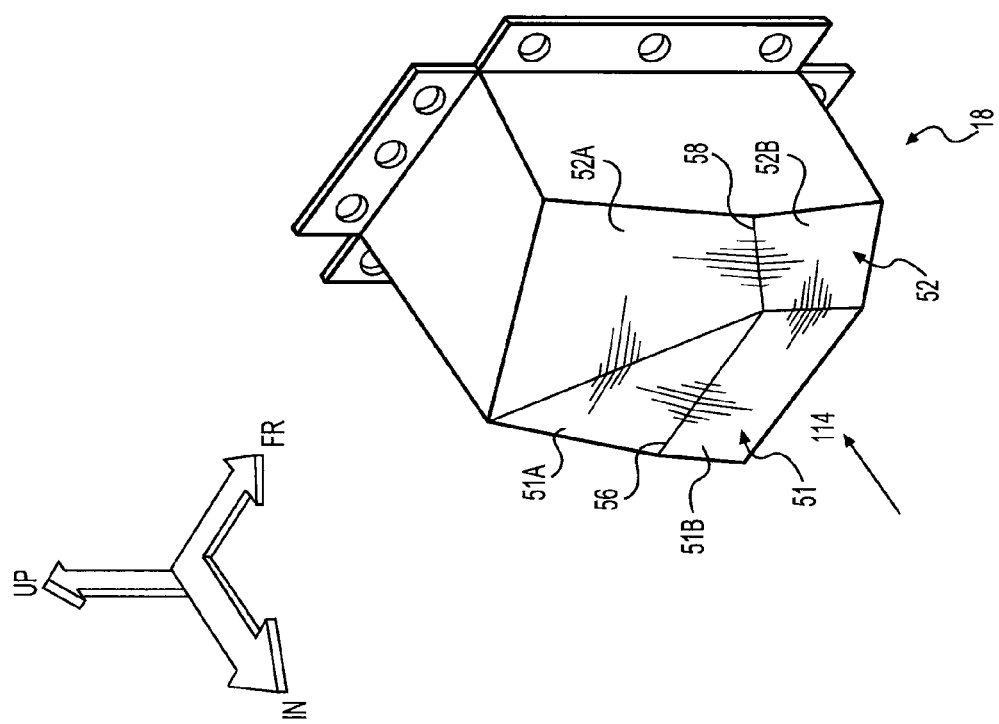
FIG. 13 is a perspective view illustrating a load transmission member.
Figure 14:
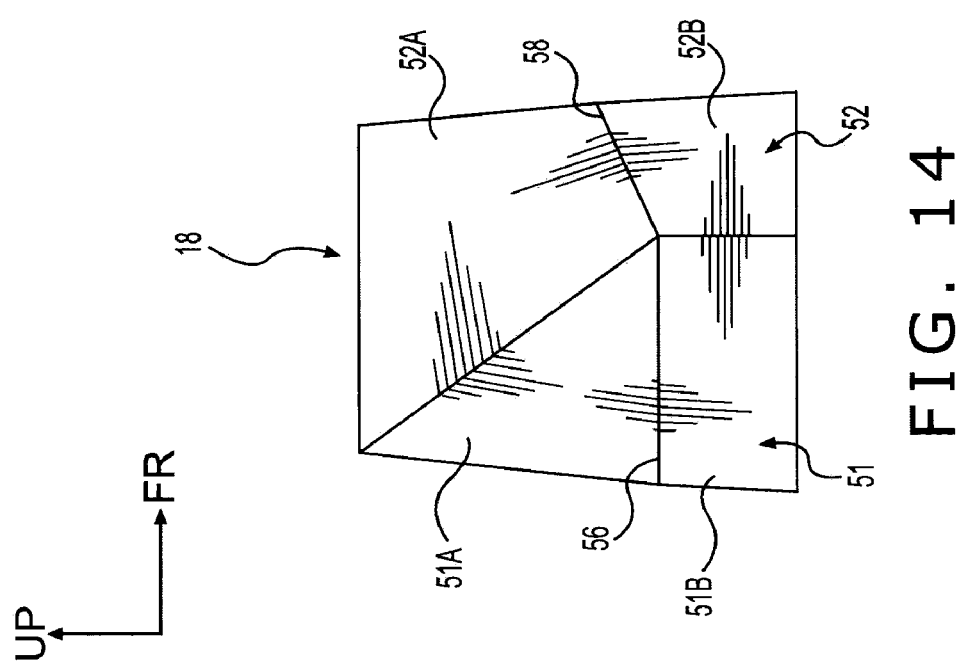
FIG. 14 is a view in a direction of arrow 114 in FIG. 13, illustrating an inboard surface of the load transmission member of FIG. 13.

In the vehicle body side structure S2 of the second embodiment, as shown in FIG. 10, the inboard face of the load transmission member 18 has a first surface 51 and a second surface 52 as load transmission surfaces. The lateral outside surface 20B of the load-receiving member 20 is generally parallel to the first surface 51 and faces the first surface 51. The relative location between the first surface 51 and second surface 52, or the angle of the second surface 52 with respect to the first surface 51 are similar to or generally identical to those between the first surface 41 and the second surface 42 in the first embodiment. The other portions are similar to those of the first embodiment. In particular, as shown in FIGs. 13 and 14, the first surface 51 and the second surface 52 may be divided by the ridge lines 56 and 58 to form upper portions 51A and 52A, which are inclined relative to lower portions 51B and 52B. The portions similar to those in the first embodiment are indicated by the common reference numerals and the explanation is omitted.

Figure 11:
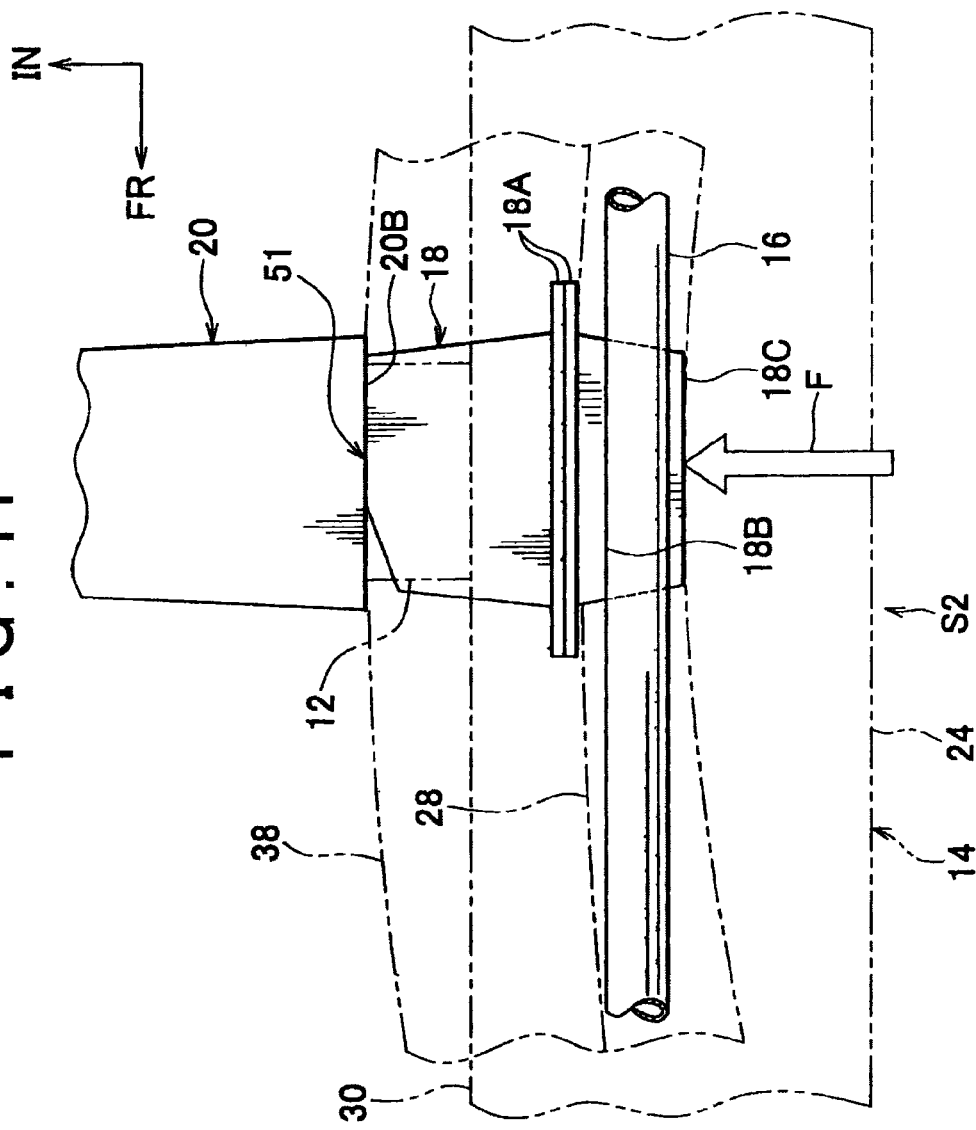
FIG. 11 is a plane view illustrating a vehicle body side structure according to the second embodiment of the present invention, in which the first surface of the load transmission member is in substantial planar contact with the lateral outside surface of the load-receiving member, when the side impact load is applied to the location of the load transmission member.

In FIG. 11, when a side impact collision occurs against the door 14 of a vehicle that has the vehicle body side structure S2, the side impact load F is applied in a lateral direction of the vehicle at the intersection of the load transmission member 18 and the impact beam 16, the load transmission member 18 presses laterally inward, and the first surface 51, as a load transmission surface, of the load transmission member 18 comes into contact with the lateral outside surface 20B of the load-receiving member 20. Thus, the side impact forth F is transmitted by the load transmission member 18 in the direction substantially parallel to the crossmember 12 via the first surface 51. In this case, because the first surface 51 comes into substantial planar contact with the lateral outside surface 20B, the deformation resistance is less likely to decrease, in comparison with the point contact or line contact. Thus, a local deformation is less likely to occur at the contact location. Accordingly, the side impact load F is transmitted to the crossmember 12 without the substantial reduction of the load transmission rate.

Figure 12:
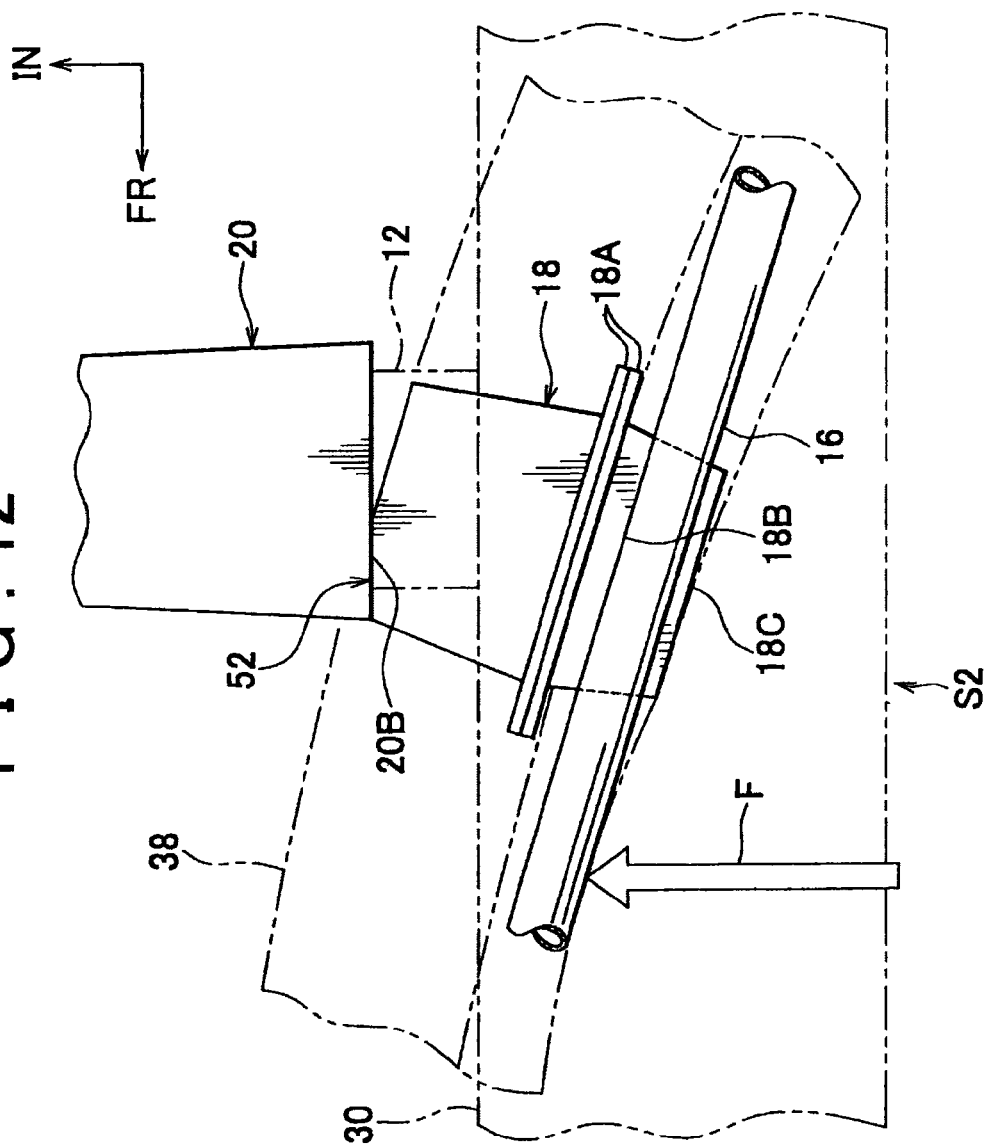
FIG. 12 is a plane view illustrating a vehicle body side structure according to the second embodiment of the present invention, in which the second surface of the inclined load transmission member is in substantial planar contact with the lateral outside surface of the load-receiving member, when the side impact load is applied to the location that is offset to the front of the load transmission member.

In addition, as shown in FIG. 12, when the side impact load F is applied to the location that is offset to the front of the load transmission member 18, the load transmission member 18 is inclined and is pressed laterally inward due to the deformation of the door 14 or the impact beam 16. Because the inclined second surface 52 is formed on the load transmission member 18, the second surface 52 comes into contact with the lateral outside surface 20B of the load-receiving member 20. Thus, the offset side impact forth F is transmitted by the load transmission member 18 in the direction substantially parallel to the crossmember 12 via the second surface 52. In this case, because the second surface 52 comes into substantial planar contact with the lateral outside surface 20B, the local deformation is less likely to occur at the contact position, in comparison with a point or line contact. Accordingly, the side impact load F is effectively transmitted to the crossmember 12 without substantial reduction of the load transmission rate. The same effect is obtained when the side impact load F is applied on the door in a direction that is oblique to the lateral direction of the vehicle, such as the oblique front direction of the vehicle.

As described above, in the vehicle body side structure S2, the side impact load F is transmitted from the load transmission member 18 to the load-receiving member 20, and the side impact load F is further transmitted to the vehicle body (not shown) via crossmember 12. Thus, the side impact load F is effectively absorbed by the vehicle body 10.

In each embodiment described above, the load transmission member 18 is in substantial planar contact with the load-receiving member 20. However, a various form of contact are acceptable, so long as a local deformation that reduces the load transmission rate does not occur upon contact.

While some embodiments of the invention have been illustrated above, it is to be understood that the invention is not limited to details of the illustrated embodiments, but may be embodied with various changes, modifications or improvements, which may occur to those skilled in the art, without departing from the spirit and scope of the invention.

The invention claimed is:

1. A vehicle body side structure comprising:
   a crossmember that is mounted on a vehicle interior floor and extends in a lateral direction of the vehicle;
   a door mounted laterally outside the crossmember;
   an inner door auxiliary member that is provided at a lower portion inside the door and extends in a longitudinal direction of the vehicle;
   a load transmission member that is mounted inside the door having a lateral inboard portion and a lateral outboard portion in contact with the inner door auxiliary member, and configured to receive an impact load from the auxiliary member; and
   a load-receiving member that is mounted on the crossmember and has a lateral outward portion facing the lateral inboard portion of the load transmission member, wherein:
   the lateral outward portion includes a first surface and a second surface oblique to the first surface; and
   at least one of the first and second surfaces is divided into an upper surface and a lower surface, with the upper surface inclined relative to the lower surface.

2. The vehicle body side structure according to claim 1, wherein the first surface extends in the substantially longitudinal direction of the vehicle and is substantially vertical, and the second surface is inclined at a predetermined angle with respect to the first surface when viewed from a top of the vehicle body.

3. The vehicle body side structure according to claim 2, wherein the second surface is located forward of the first surface in the longitudinal direction of the vehicle, and the predetermined angle is between 15 and 20 degrees.

4. The vehicle body side structure according to claim 1, wherein the upper surface faces upward with respect to the lower surface.

5. The vehicle body side structure according to claim 1, wherein the load-receiving member and the crossmember are unitarily formed in one piece.

6. The vehicle body side structure according to claim 1, wherein the load transmission member comprises first and second flange portions, each flange portion having first and second surfaces, the first surface of the first flange portion contacting the first surface of the second flange portion, and a box portion attached to each second surface.

7. A vehicle body side structure comprising:
   a crossmember that is mounted on a vehicle interior floor and extends in a lateral direction of the vehicle;
   a door mounted laterally outside the crossmember;
   an inner door auxiliary member that is provided at a lower portion inside the door and extends in a longitudinal direction of the vehicle;
   a load transmission member that is mounted inside the door and includes a first surface and a second surface oblique to the first surface, wherein at least one of the first and second surfaces includes an upper surface and a lower surface, with the upper surface inclined relative to the lower surface, and a lateral outboard member in contact with the inner door auxiliary member, and configured to receive an impact load from the auxiliary member; and
   a load-receiving member that is mounted on the crossmember and includes a lateral outer surface that faces the first and second surfaces of the load transmission member.

* * * * *